United States Patent
Nonaka

[11] Patent Number: 5,986,764
[45] Date of Patent: Nov. 16, 1999

[54] DISTANCE MEASUREMENT DEVICE

[75] Inventor: Osamu Nonaka, Sagamihara, Japan

[73] Assignee: Olympus Optical Co., Ltd., Tokyo, Japan

[21] Appl. No.: 09/075,195

[22] Filed: May 11, 1998

[30] Foreign Application Priority Data

May 12, 1997 [JP] Japan ..................................... 9-120500

[51] Int. Cl.⁶ ................................................. G02B 21/06
[52] U.S. Cl. ........................ 356/390; 356/390; 356/388; 356/338
[58] Field of Search ..................... 356/390, 388, 356/338

[56] References Cited

U.S. PATENT DOCUMENTS

| | | | |
|---|---|---|---|
| 5,068,682 | 11/1991 | Utagawa | 354/402 |
| 5,138,357 | 8/1992 | Utagawa | 354/402 |
| 5,293,428 | 3/1994 | Kondou et al. | 356/390 |
| 5,602,944 | 2/1997 | Yokoyama et al. | 356/390 |

FOREIGN PATENT DOCUMENTS

62-148910  7/1987  Japan .
62-255925  11/1987  Japan .
2-135311  5/1990  Japan .

*Primary Examiner*—Robert H. Kim
*Assistant Examiner*—Reginald Ratliff
*Attorney, Agent, or Firm*—Pillsbury Madison & Sutro LLP

[57] ABSTRACT

A distance measurement device of the present invention detects a subject image with separation from the background and determines the distance to the subject regardless of backlit or forelit situations. In the distance measurement device, the subject is imaged onto two sensor arrays through different optical paths having parallax. The displacement of one of image signals output from the sensor arrays relative to the other is detected to determine the distance to the subject. On the basis of output signals of the sensor arrays, an object detector unit in a CPU determines a main area in the entire area of each sensor array which is occupied by the main subject image. On the basis of output signals from the main area in each sensor array detected by the object detector unit, a correlation operation unit calculates the displacement of the subject image on one sensor array relative to the subject image on the other sensor array.

28 Claims, 8 Drawing Sheets

DISTANCE MEASUREMENT DEVICE

BACKGROUND OF THE INVENTION

The present invention relates to a distance measurement device and more specifically to a passive distance measurement device which determines the distance to a subject using its images.

A distance measurement device conventionally built into cameras is a passive one which determines the distance to a subject using its images. This passive distance measurement device detects the displacement of one of two images of the same subject which are obtained through different optical paths relative to the other and determines the distance to that subject on the principle of triangulation.

The image signals are generally produced by an opto-electric conversion sensor array. The sensor array is not necessarily adapted to receive the images of a main subject alone, but will convert into image signals even images, such as background and the like, other than the main subject to be actually measured.

To minimize the effect of background, various techniques have already been developed. For example, there are known a technique that splits a sensor array (Japanese Unexamined Patent Publication No. 62-148910) and a technique that uses a spot where there is very little change in image signal for focusing. Also, a camera that uses distance measurements at multiple points to decide whether a shooting scene is back light or not is disclosed in Japanese Unexamined Patent Publication No. 62-255925.

However, according to the technique disclosed in Japanese Unexamined Patent Publication No. 62-148910, since a spot of the highest contrast is given priority over others, in back light situations by way of example, distance measurement may be made on the basis of a high-contrast spot on the boundary between the subject and the background. With such a spot where near and distant subjects are mixed, there is the possibility of inaccurate distance measurement.

Moreover, in the technique disclosed in Japanese Unexamined Patent Publication No. 2-135311, since a spot where very little change occurs in image signal is given priority, a sufficient contrast cannot be obtained. Thus, a comparison between two images, i.e., a determination of the distance to the main subject, becomes often impossible.

Furthermore, the technique disclosed in Japanese Unexamined Patent Publication No. 62-255925 contemplates only deciding back light situations, but not taking measures against such a situation where near and distant subjects are mixed as described above at all.

BRIEF SUMMARY OF THE INVENTION

It is therefore an object of the present invention to provide a distance measurement device which permits a subject image to be detected with separation from the background and the distance to the subject to be determined accurately irrespective of follow light or back light conditions.

A first object of the present invention is to provide a distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising: object determining means responsive to output signals of the sensor arrays for determining those areas on the sensor arrays which correspond to the main subject; and operations means responsive to distributions of output signals from the areas of the sensor arrays corresponding to the main subject for calculating the displacement of one of the images relative to the other.

A second object of the present invention is to provide a distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising: object determining means responsive to output signals of the sensor arrays for determining those areas of the sensor arrays which correspond to the main subject on the basis of the difference between a signal relating to a main subject and a signal relating to background which is a region other than the main subject; and operations means responsive to signals relating to the corresponding areas for calculating the displacement of one of the images relative to the other.

A third object of the present invention is to provide a distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising: person sensor width information outputting means for outputting a value for a sensor array width as an area onto which a given region of a person as a subject is imaged; object determining means responsive to output signals of the sensor arrays for determining those areas of the sensor arrays which correspond to a main subject; and person decision means for making a comparison between the sensor array width outputted by the person sensor width information outputting means and the corresponding sensor array area determined by the object determining means to decide whether the main subject is a person or not.

A fourth object of the present invention is to provide a distance measurement device comprising: sensor array means for outputting signals corresponding to the distribution of brightness in a shooting scene; detecting means for detecting an area of the sensor array means which corresponds to a portion of sensor array output distribution which shows an upward or downward peak; and decision means for deciding whether a person is included in a shooting scene or not on the basis of the number of pixels in the area of the sensor array means detected by the detecting means.

A fifth object of the present invention is to provide a distance measurement device comprising: sensor array means for outputting signals corresponding to the distribution of brightness in a shooting scene; detecting means for detecting an area of the sensor array means which corresponds to a portion of sensor array output distribution which shows an upward or downward peak; decision means for deciding whether a person is included in a shooting scene or not on the basis of the number of pixels in the area of the sensor array means detected by the detecting means; and control means for, when it is decided by the person decision means that a person is included, performing shooting control in such a way that the person is shot properly.

A sixth object of the present invention is to provide a camera distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising: detecting means for detecting an area of the sensor arrays in which the distribution of output signals varies; person decision means for deciding whether a person is included in a shooting scene or not on the basis of the number of pixels in the sensor array area detected by the detecting means; and control means for, when it is decided by the person decision means that a person is included, casing the distance measurement device to make distance determination again using the pixels in the sensor array area detected by the detecting means.

A seventh object of the present invention is to provide a distance measurement device having sensor arrays for detecting image signals which differ in field of view comprising: specific portion selecting means for selectively extracting image signals associated with a specific portion in the different fields of view from output signals of the sensor arrays; and identifying means for examining a pattern that the selectively extracted image signals changes, detecting the pattern to be a pattern that the image signals change upward and then downward or a pattern that the image signals change downward and then upward, and identifying an image signal associated with a subject to be focused on the basis of the shape and width of the pattern detected.

A ninth embodiment of the present invention is to provide a distance measurement device having sensor arrays for detecting image signals which differ in field of view comprising: specific portion selecting means for selectively extracting image signals associated with a specific portion in the different fields of view from output signals of the sensor arrays; maximum/minimum detecting means for examining a pattern of changes of the image signals associated with the specific portion and detecting its maximum or minimum; and identifying means for identifying an image signal associated with a subject to be focused in accordance with changes of the image signals on both sides of the maximum or minimum.

A tenth object of the present invention is to provide a distance measurement device having sensor arrays for detecting image signals which differ in field of view comprising: difference detecting means for detecting a difference between output signals of adjacent sensor elements in the sensor arrays; image signal distribution shape deciding means for deciding the shape of the distribution of image signals in accordance with output signals of the difference detecting means and image signals from the sensor arrays; and identifying means responsive to the image signal distribution shape deciding means for identifying an image signal associated with a subject to be focused.

An eleventh object of the present invention is to provide a distance measurement device having sensor arrays for detecting image signals which differ in field of view comprising: pattern detecting means for detecting a pattern that image signals changes using the sensor arrays; and changing means responsive to the pattern detecting means for changing the effective number of pixels in each of the sensor array to identify an image signal associated with a subject to be focused.

A twelfth object of the present invention is to provide a distance measurement device having sensor arrays for detecting image signals which differ in field of view comprising: pattern detecting means for examining the shape of a pattern of changes of image signals by sequentially comparing an output of each sensor element with that of the adjacent sensor element in the sensor arrays; identifying means for identifying an image signal associated with a subject to be focused in accordance with the pattern of changes of image signals; and operations means for calculating the distance to the subject in accordance with the image signals identified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 2A, 2B and 2C illustrate a method of detecting an amount of deviation x between images, specifically

FIGS. 3A and 3B illustrate the distance determination in a follow light situation, specifically

FIGS. 4A and 4B illustrate the distance determination in a back light situation, specifically

DETAILED DESCRIPTION OF THE INVENTION

First, a first embodiment of the present invention will be described with reference to FIGS. 1 through 6.

Figure 1:
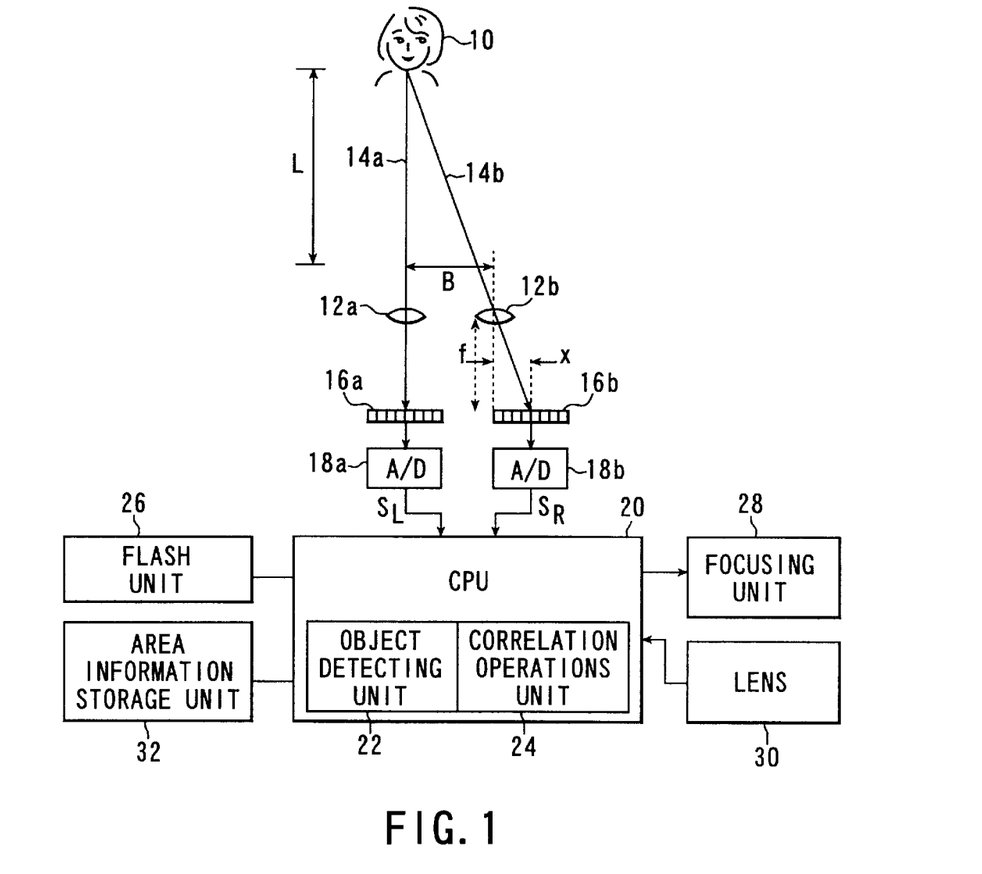
FIG. 1 shows a basic arrangement of a distance measurement device based on triangulation in accordance with the present invention.

FIG. 1 is a schematic representation of a triangulation-based distance measurement device according to the present invention.

In FIG. 1, 10 denotes a person as the main subject the distance to which is to be determined. The images of the subject are formed by two lenses 12a and 12b, which are at a distance of L from the subject, through two defined optical paths 14a and 14b onto opto-electric conversion sensor arrays 16a and 16b. The resulting images are converted by the sensor arrays 16a and 16b into electrical signals the magnitude of which depends on the light and shade of the images. The electrical signals, which are analog signals, are converted by analog-to-digital (A/D) converters 18a and 18b into a digital form which is easy to be processed by a central processing unit (CPU) 20 consisting of a one-chip microcomputer.

The CPU 20 has an object detecting unit 22 and a correlation operations unit 24 built in. The object detecting unit 22 performs operations on the digital signals from the A/D converters 18a and 18b to discriminate the subject against background. In the correlation operations unit 24, the amount of displacement of one of the two images on the sensor arrays relative to the other is calculated on the basis of the digital signals from which background components have been eliminated.

When the distance measurement device is used with a camera, an exposure assist flash unit 26, an autofocusing unit 28, an autofocusing taking lens unit 30 and an area information storage unit 32 will be attached to the CPU 20 as shown. The autofocusing unit 28 calculates the autofocusing distance from the image displacement amount and drives the motor (not shown) associated with the autofocusing lens 30, thereby bringing the subject into focus. The flash unit 26 assists exposure by emitting a flash of light according to shooting situations. The area information storage unit 32 stores area information which will be described later.

Supposing in the triangulation system of FIG. 1 that the distance between the principal points of the lenses 12a and 12b, or the base length to be B, the distance between the lenses and the sensor arrays to be f, and the distance to the subject to be L, the distance L can be calculated as $$L = \frac{B \cdot f}{x} \quad (1)$$

where x is the amount of displacement of one of the two subject images on the sensor arrays relative to the other.

Figure 2A:
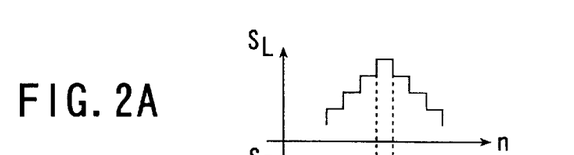
FIG. 2A shows the output characteristic of the A/D converter 18a of FIG. 1.
Figure 2B:
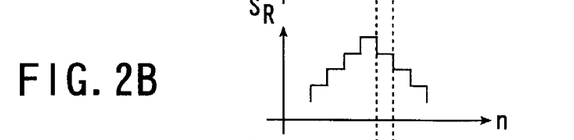
FIG. 2B shows an output characteristic of the A/D converter 18b.
Figure 2C:
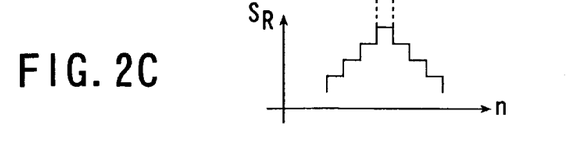
FIG. 2C shows another output characteristic of the A/D converter 18b.

Reference will now made to FIGS. 2A, 2B and 2C to describe a method of detecting the amount x of displacement of the image on the array 16b with respect to that on the array 16a.

FIG. 2A shows a plot of values of digital image signals output from the A/D converter 18a for image signals output from the sensor array 16a versus the sensor numbers in the sensor array.

FIG. 2B shows output values of the A/D converter 18b of FIG. 1, which are image signals that differ from the image signals from the A/D converter 18a in the field of view they cover, i.e., image signals that are obtained through the lens 12b.

When the subject distance increases, an image formed on the sensor array 16b shifts in the direction that x defined in FIG. 1 decreases. When the subject distance decreases, on the other hand, the image shifts in the direction that x increases. The sensor array 16b produces an image signal which is similar to that of FIG. 2A. In the sensor array 16b, the positions of the sensor elements (cells) that produce that image signal are shifted according to the displacement amount x. Thus, the CPU 20 can determine the amount of displacement of the image formed on the sensor array 16b with respect to the image formed on the sensor array 16a by making a comparison between the image signals produced by the sensor arrays 16a and 16b for each sensor element.

That is, in a state where the peak of the image signal $S_R$ produced by the sensor array 16b shown in FIG. 2B is displaced with respect to that of the image signal $S_L$ from the sensor array 16a shown in FIG. 2A, the sum of differences each produced between signals produced by corresponding sensor elements in the arrays is large. On the other hand, when, as shown in FIG. 2C, the signal $S_R$ coincides in peak position with the signal $S_L$, the sum of differences will be small. Thus, the CPU 20 can calculate the amount of displacement of one image with respect to the other image by comparing the signal $S_R$ with the signal $S_L$ while changing corresponding sensor elements in the arrays for comparison in turn.

Such calculations are referred to as correlation operations, which, in FIG. 1, is performed by the correlation operations unit 24.

Figure 3A:
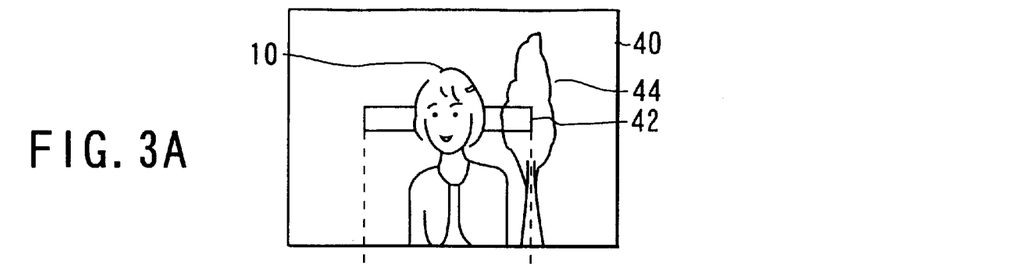
FIG. 3A shows a follow light scene and FIG. 3B shows the sensor data output characteristic in the case of the scene of FIG. 3A.
Figure 4A:
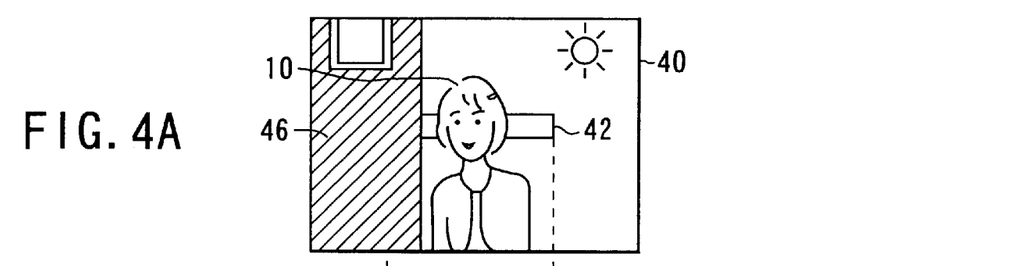
FIG. 4A shows a back light scene and FIG. 4B shows the sensor data output characteristic in the case of the scene of FIG. 4A.

Even with the distance measurement device using the principle of triangulation, difficulties are involved in determining the distance to a subject accurately regardless of whether it is located in a follow light scene shown in FIG. 3A or in a back light scene shown in FIG. 4A.

In FIG. 3A, a ranging sensor array detectable area 42 indicated in a viewfinder scene 40 includes a subject 44 other than the main subject 10, for example, a tree in the background. In such a situation, comparison between sensor data outputs including background images as well as the main subject image will produce an error in distance measurement. This is because images of subjects located at different distances are involved in performing correlation operations.

Figure 3B:
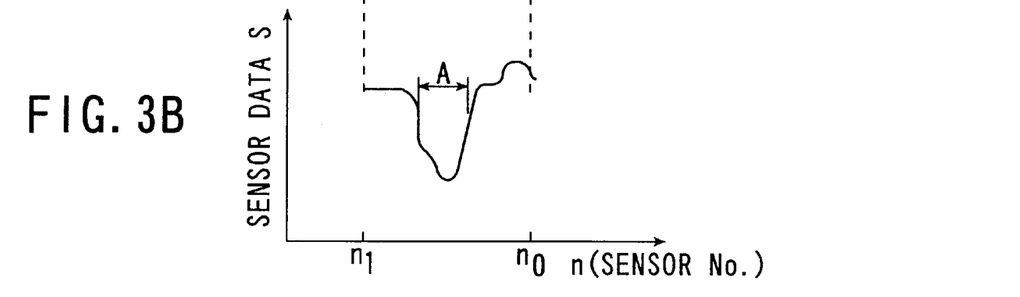

In the scene 40 as shown in FIG. 3A, if only data in a portion indicated at A of the entire sensor data obtained as shown in FIG. 3B is used for correlation operations, then the distance to the main subject will be determined accurately. This is because the tree 44 in the background comes to have no effect on the correlation operations.

In the sensor array, the magnitude of photo-currents increases with increasing intensity of incident light. If a large photocurrent is stored on a capacitor, fast integration up to a predetermined level will be achieved. In the first embodiment, A/D conversion shall be made by counting the integration time. For this reason, in such a follow light scene as shown in FIG. 3A, the integration is performed fast for the face of the person 10. In contrast, in such a back light scene as shown in FIG. 4A, the integration for the face of the person or a building 46 in the background will be slower than that for other portions in the background.

Figure 4B:
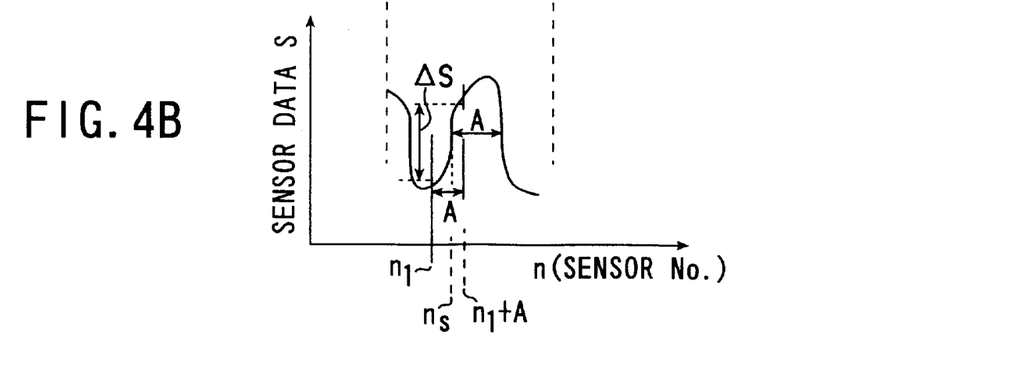

Therefore, sensor data for the face is detected as a downward peak with respect to background components as shown in FIG. 3B in the case of the follow light scene or an upward peak as shown in FIG. 4B in the case of the back light scene. In the present invention, the downward or upward peak region corresponding in width to the face is given priority over other regions, thereby allowing the distance between the device and the main subject to be determined accurately. In other words, data in other regions than that region is not used for correlation operations described above.

In the situation shown in FIG. 4B, if output signals of successive sensor elements from the $n_1$-th sensor element to the ($n_1$+A (corresponding to the face width))-th sensor element were used, the effect of the background would appear in the result of correlation operations. Thus, the sensor data region of the same width A which exhibits an upward peak is detected and then selectively used for distance measurement. That is, in FIG. 4B, the region from ns to $n_s$+A is used. To this end, the subject detection unit 22 has a function of shifting the correlation area so as to make the distance measurement starting at the $n_s$-th sensor element, not the $n_1$-th sensor element.

Here, the operation of a camera having the subject detection function will be described with reference to a flowchart shown in FIG. 5.

First, in step S1, a variable n representing the first sensor in the sensor array at which correlation operation is started is initialized. Eventually, the correlation operation is performed using output signals of a number A of successive sensor elements starting at the sensor element represented by the variable, A corresponding to the width of the face of the person 10 as the main subject. The correlation operation, which was expressed previously as the sum of differences, is mathematically expressed as follows:

$$\sum_{n}^{A} |R(n+2) - L(n)| \quad (2)$$

where L(n) and R(n) represent output data of the respective n-th sensor elements in the sensor arrays 16a and 16b.

Figures 5, 6:
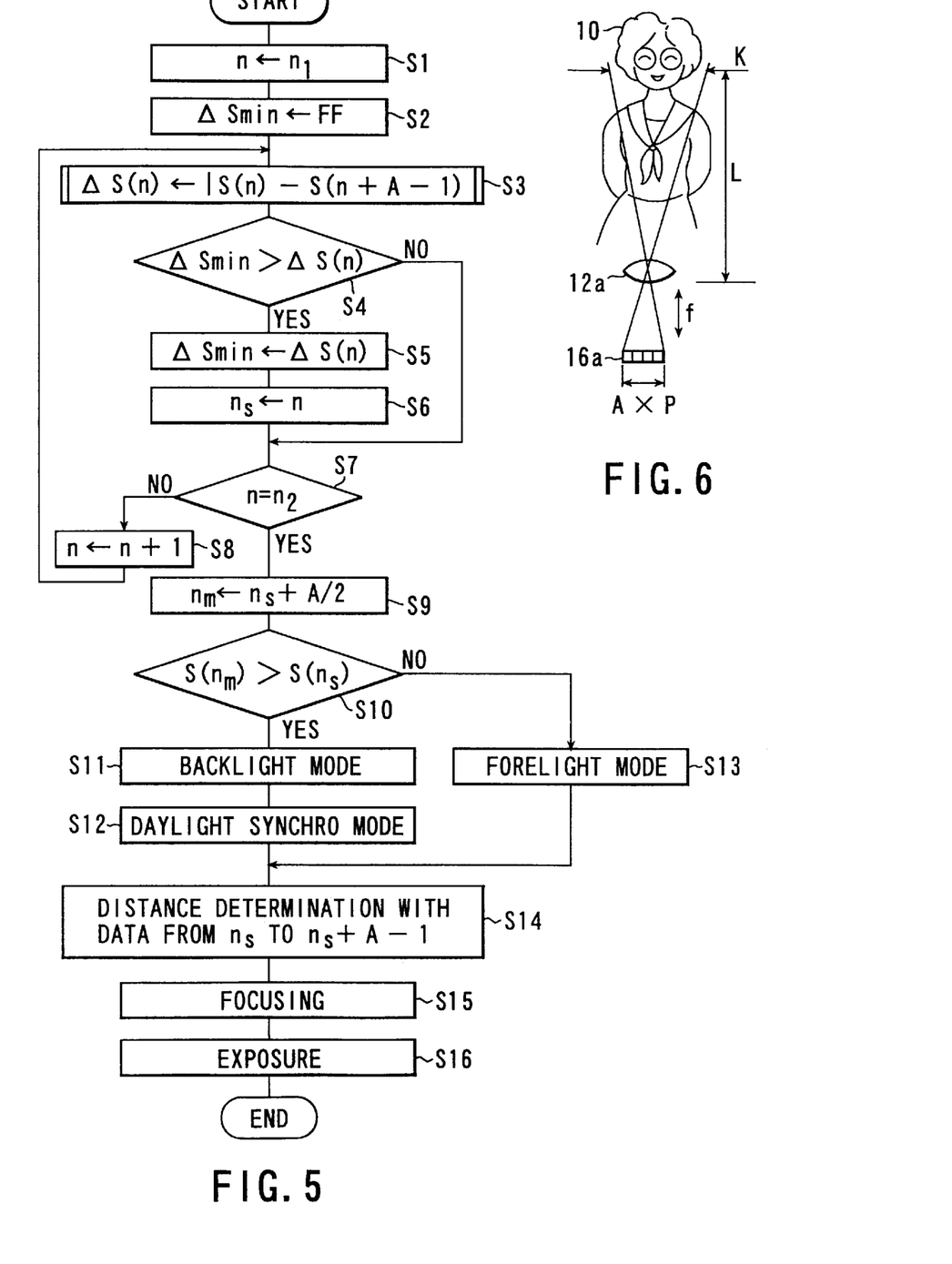
FIG. 5 is a flowchart illustrating the operation of a first embodiment of the present invention.
FIG. 6 is a diagram for use in explanation of a number A of sensor elements corresponding to the width of the face of a person.

Supposing that, as shown in FIG. 6, the width of the face of the person 10 is K, the distance to the device is L, and the focal length of the lens 12 is f, the "A" is obtained from the following expression:

$$P \times A = \frac{f}{L} \cdot K \quad (3)$$

where P is the sensor element pitch in each sensor array.

It is recommended that the distance L be set to the usually used shooting distance, for example, fifty times the focal length of the taking lens 30.

Returning now to FIG. 5, in step S2, a variable ΔSmin indicating the minimum value of data differences is initialized. Here, the variable is set to FF (=256) in the hexadecimal numbering system which is the maximum value for 8-bit data. Next, in step S3, the absolute value ΔS(n) of the difference between output data of the n-th sensor element and the (n+A−1)st sensor element (the sensors at both ends of the correlation area) is calculated.

In step S4, if ΔS(n) is smaller than ΔSmin already detected, a decision is made as to whether ΔS(n) is to be updated as ΔSmin or not. If it is not, the procedure goes to step S7 to be described later; otherwise, the procedure goes to steps S5 and S6. In steps S5 and S6, ΔS(n) and n at this time are stored as ΔSmin and ns, respectively.

In step S8, n is incremented by one until n reaches n2 in step S7. Steps S3 through S7 are repeated to detect the value of n at which the difference between data at both ends of the range A shows the minimum value ΔSmin.

In accordance with the algorithm described above, the distance measuring area is shifted because $n_s$ is smaller than $n_1$ in the difference between sensor outputs at both ends of the range A in the case of data shown in FIG. 4B.

However, the above-described steps alone cannot detect which of downward and upward peaks the sensor data has. In step S9, therefore, a sensor element $n_m$ intermediate between $n_s$ and $n_s$+A−1 is sought. In subsequent step S10, output data $S(n_m)$ of that intermediate sensor is compared with output data $S(n_s)$ of the starting $n_s$-th sensor element.

If $S(n_m) > S(n_s)$, it is decided that the shooting scene is back light as shown in FIG. 4A and as a consequence the backlight mode is carried out in step S11. If $S(n_s) > S(n_m)$ in step S10, on the other hand, the decision is a follow light scene. In this case, the follow light mode is carried out in step S13. In the case of back light scene, since the daylight synchro shooting mode is selected in step S12, the face of the subject will not blacken even in back light situations owing to backlight compensation by the flash unit.

In step S14, the correlation operation is performed on data from a number A of successive sensor elements starting at the $n_s$-th sensor element to determine the subject distance. Thereby, accurate distance measurement can be made independent of background. In subsequent steps S15 and S16, focusing and exposure are carried out, respectively.

As described above, according to the first embodiment, shooting can be carried out with the main subject accurately brought into focus regardless of background conditions or follow light or back light situations. In back light situations, since exposure is controlled (that is, the daylight synchro flash mode is used), properly exposed pictures can be taken with ease.

Figure 7:
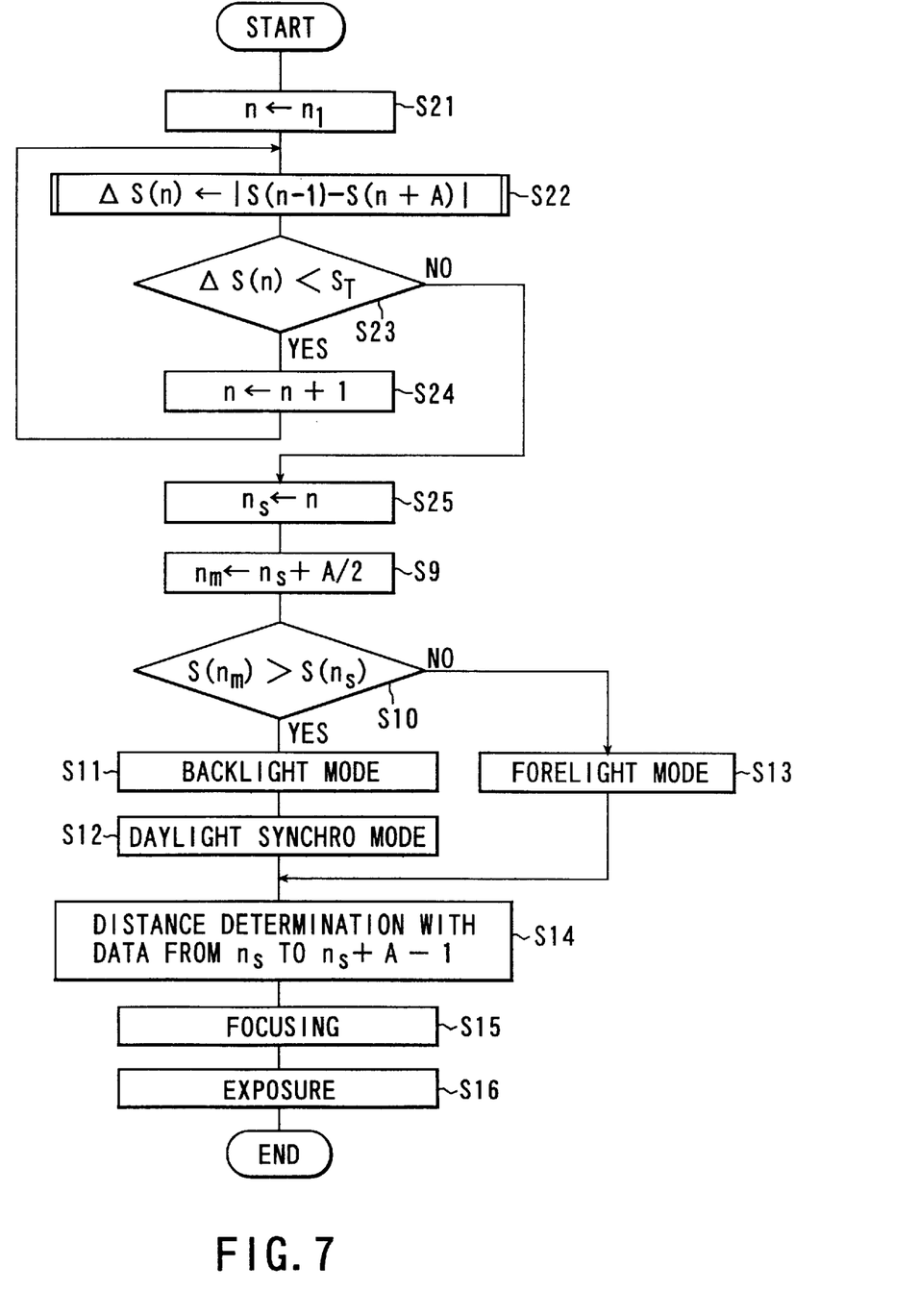
FIG. 7 is a flowchart illustrating the operation of a second embodiment of the present invention.

A second embodiment of the present invention will be described with reference to a flowchart of FIG. 7.

The second embodiment does not seek the minimum difference between sensor outputs for sensor elements numbered from $n_1$ to $n_2$ but seeks the sensor number ns for which the sensor output difference is lower than a predetermined level $S_T$.

That is, in step S21, a variable n indicating the sensor number of the first sensor element at which the correlation operation is started is initialized. In subsequent step S22, the absolute value ΔS(n) of a difference between sensor outputs S(n−1) and S(n+A) of the (n−1)st sensor and the (n+A)th sensor element (the sensors at both ends) is calculated.

In step S23, the absolute value ΔS(n) is compared with the predetermined level $S_T$. If the absolute value ΔS(n) is greater than $S_T$, then the procedure goes to step S24 in which n is incremented by one and returns to step S22; otherwise, the procedure goes to step S25 in which n at that time is stored as $n_s$. Thus, an area is selected for which the difference between the outputs of sensor elements located at both ends thereof is small.

The subsequent processing remains unchanged from FIG. 5. In FIG. 7, the corresponding blocks to those in FIG. 5 are denoted by like step numbers and their descriptions are omitted.

A third embodiment of the present invention will be described next.

Figure 8:
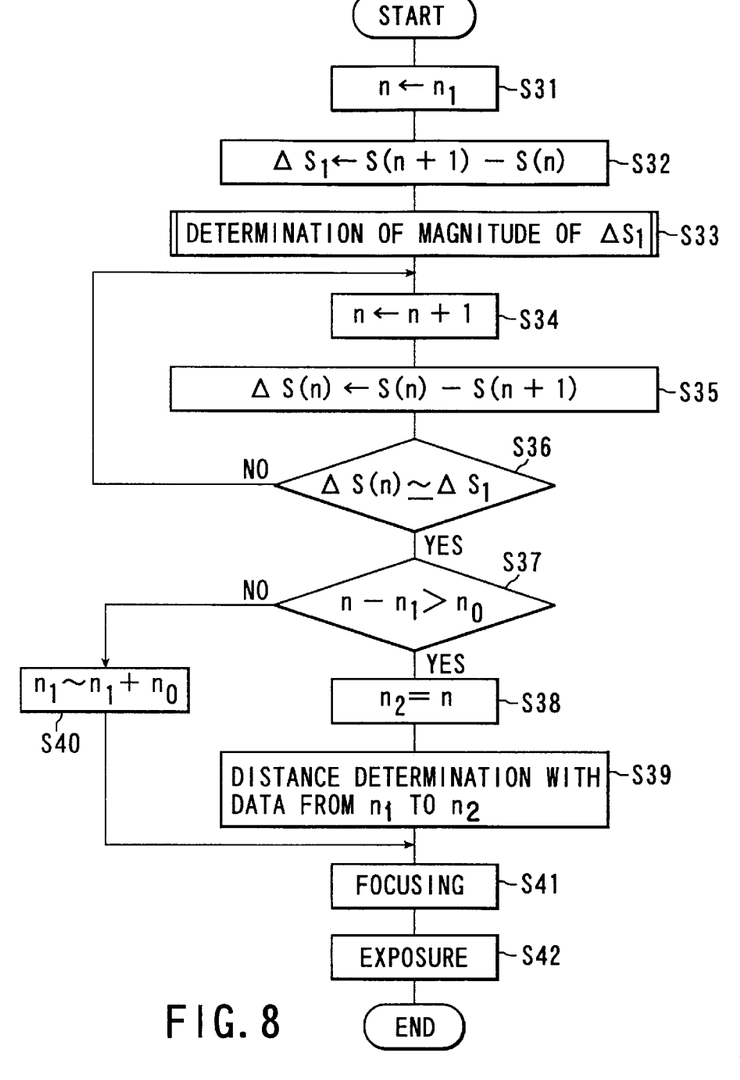
FIG. 8 is a flowchart illustrating the operation of a third embodiment of the present invention.
Figure 9A:
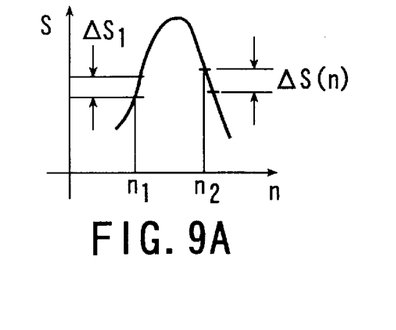
FIG. 9A shows a sensor data output characteristic representing how the rate of change $\Delta S1$ in sensor data on one side and the rate of change $\Delta S(n)$ in sensor data on the other side are related to each other.

FIG. 8 is a flowchart for the operation of the third embodiment, which, as shown in FIG. 9A, determines the edges of the face by detecting that portion on one side of the sensor output characteristic which indicates a rate of change S(n) that is equal to a rate of change $\Delta S_1$ on the other side of the sensor output characteristic with A corresponding to the face width kept unchanged.

First, in steps S31 and S32, the output data $S(n_1)$ and $S(n_1+1)$ of the $n_1$-th sensor element is subtracted from the output data of the $(n_1+1)$st sensor element, thus obtaining $\Delta S1$. In step S33, the magnitude of $\Delta S_1$ is determined. After that, n is incremented by one in step S33 and, in step S35, $S(n)-S(n+1)$ is calculated, this calculation being opposite in the direction of data comparison (subtraction) to that in step S32.

Next, in step S36, a decision is made as to whether or not the result in step S35 is substantially equal to the result in step S32. If it is not, then the procedure returns to step S34. If, on the other hand, the decision is that the result in step S35 is substantially equal to the result in step S32, then the distance determination is made on the basis of output data from the $n_1$-th to n-th sensor elements.

Figure 9B:
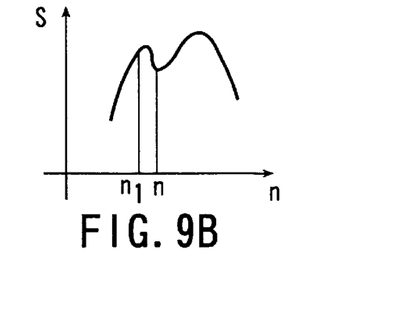
FIG. 9B shows a sensor data output characteristic in which there are few pieces of data between n1 and n.

In the case of sensor data as shown in FIG. 9B, the number of pieces of data between $n_1$ and n is too small, disabling accurate distance determination.

To cope with such a situation, in step S37, a decision is made as to whether or not $(n-n_1)$ is smaller than a predetermined number of pieces of data, $n_0$. If the decision is that $n-n_1$ is smaller than $n_0$, then the procedure goes to step S40 in which the predetermined number of pieces of data is ensured. The procedure then goes to step S41.

If the decision in step S37 is that a sufficient number of pieces of data is obtainable, the edge portions of an upward peak as shown in FIG. 9A can be captured, allowing accurate distance determination. The procedure thus goes to step S38 in which $n_2$ is set to n. In step S39, the distance determination is made on the basis of data from the $n_1$-th to $n_2$-th successive sensor elements.

Focusing is performed in step S41 and then exposure is carried out in step S42. Thus, an AF camera can be provided which detects properly a sensor data region of a downward or upward peak and hence allows accurate focusing independently of background conditions.

The above-mentioned step S3 is carried out to decide clear edges. That is, the magnitude of $\Delta S_1$ is decided and, when it is small, the sensor number is changed to select a sensor data region where $\Delta S_1$ is larger. Although this step is not necessarily needed, it would be more effective to carry out.

Next, a fourth embodiment of the present invention will be described.

Figures 10, 11:
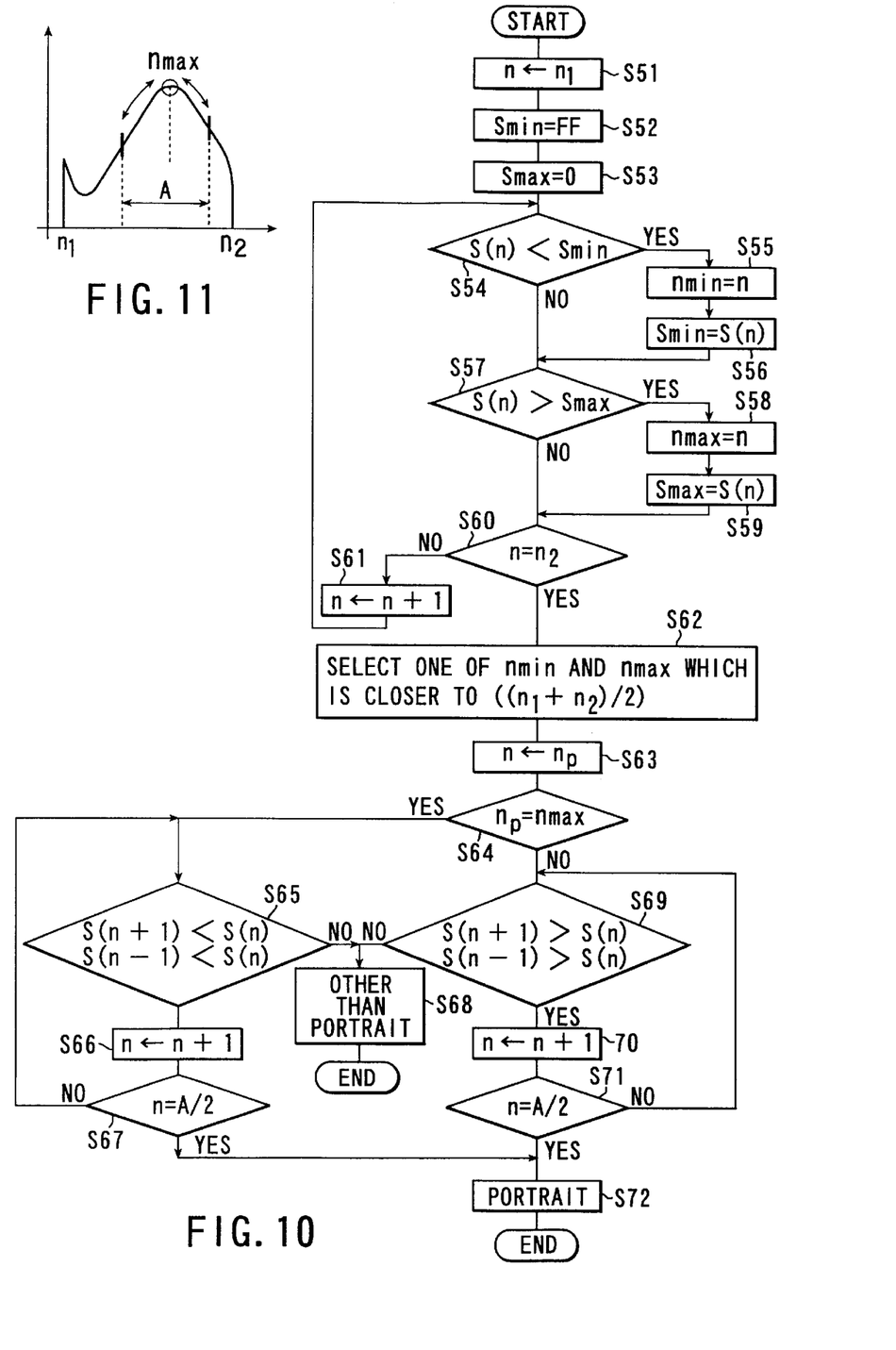
FIG. 10 is a flowchart illustrating the operation of a fourth embodiment of the present invention.
FIG. 11 shows a sensor data output characteristic in the fourth embodiment.

FIG. 10 is a flowchart illustrating the operation of the fourth embodiment and FIG. 11 shows an example of sensor output data in the fourth embodiment.

In steps S51, S52 and S53, variables n, Smin and Smax are initialized, respectively. In step S52, Smin is set to FF in the hexadecimal numbering system, or the maximum value of 8-bit data.

Next, in step S54, sensor data S(n) is compared with the minimum value Smin. If S(n)<Smin, then the procedure goes to steps S55 and S56, so that the sensor number nmin of a sensor element that produces the minimum value Smin is recorded and the minimum value Smin of sensor data is obtained.

In step S57, sensor data S(n) is compared with the maximum value Smax. If S(n)>Smax, the procedure goes to steps S58 and S59 in which the sensor number nmax of a sensor element that outputs the maximum value Smax is recorded and the maximum value Smax of sensor data is obtained.

In step S60, a decision is made as to whether the sensor number has reached n2. If it has not yet, n is incremented by one in step S61 and then the procedure returns to step S54, so that steps S54 through S61 are repeated until n reaches n2.

That is, the sensor data is sequentially compared with the minimum value and the maximum value to obtain the maximum value Smax and the minimum value Smin of sensor data from $S(n_1)$ to $S(n_2)$ and at the same time the sensor numbers, nmin and nmax, of sensor elements that output Smin and Smax are stored. In step S62, a selection is made from nmin and nmax which is closer to the intermediate one of all the sensor numbers and then defined as np. In step S63, np is set to the sensor number n. In step S64, a decision is made as to whether or not $n_p$=nmax. Thereby, it can be known whether sensor data increases or decreases toward $n_p$.

If the sensor data decreases, then the procedure goes to step S65 to decide sensor data S(n). In step S65, if $S(n)>S(n+1)$ and $S(n)>S(n-1)$, the procedure goes to step S66 in which n is incremented by one. If, in step S67, n is equal to half of A corresponding to the face width, then the procedure goes to step S72 in which the portrait mode is set. If, in step S67, n is not equal to A/2, then the procedure returns to step S65.

If, in step S65, S(n) is smaller than $S(n+1)$ and $S(n-1)$, the procedure goes to step S68 in which a mode other than the portrait mode is set.

If, in step S64, the decision is that np is not equal to nmax, the procedure goes to step S69 in which a decision is made as to whether the sensor data increases. If $S(n+1)>S(n)$ and $S(n-1)>S(n)$, n is incremented in step S70 and then a decision is made in step S71 as to whether or not n=A/2. If the decision indicates equality, then the procedure goes to step S72 in which the portrait mode is set; otherwise, the procedure returns to step S69. If, in step S69, $S(n)>S(n+1)$ and $S(n)>S(n-1)$, a mode other than the portrait mode is set in step S68.

That is, in the steps that follow step S64, a decision is made by the CPU 20 as to whether the sensor data has an upward peak (maximum) or a downward peak (minimum) within the range A corresponding to the width of the face of the person 10. If it has, it is decided that the subject is a person. In this case, sensor data over the range A in FIG. 11 is used to make distance measurement. If the subject is not a person, distance measurement is made using sensor data over the entire range from $n_1$ to $n_2$.

A fifth embodiment of the present invention will be described next.

Figures 12, 13:
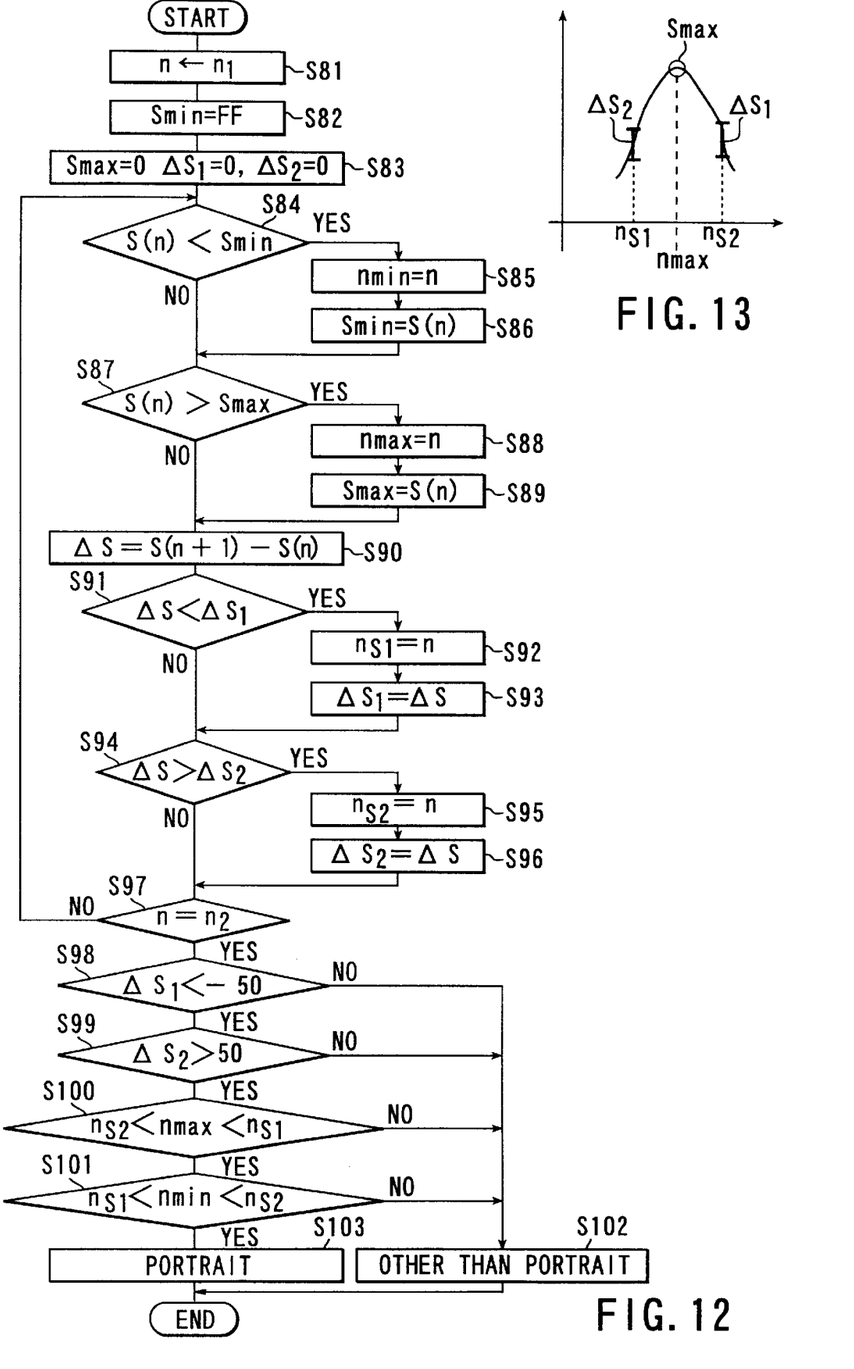
FIG. 12 is a flowchart illustrating the operation of a fifth embodiment of the present invention.
FIG. 13 shows a sensor data output characteristic in the fifth embodiment.

FIG. 12 is a flowchart illustrating the operation of the fifth embodiment and FIG. 13 shows an example of sensor output data in the fifth embodiment.

The fifth embodiment is intended to capture clear edge portions of an upward or downward peak with certainty and extract only sensor data for the main subject more accurately.

Like steps S51, S52 and S53 of FIG. 10, in steps S81, S82 and S83, each variable is initialized. $\Delta S_1$ and $\Delta S_2$ each represent the maximum value of the differences between each piece of data and the adjacent one. $\Delta S1$ represents the maximum value of the differences with minus sign and $\Delta S2$ represents the maximum value of the differences with plus sign.

In the loop composed of blocks S84 through S97, a maximum value (Smax), a minimum value (Smin) and the maximum value of the difference between adjacent pieces of data in sensor data from S(n1) to S(n2) are obtained as in FIG. 10.

In each of steps S98 and S99, a decision is made as to whether or not the maximum value is smaller than a predetermined value (for example, −50 and 50). If the maximum value is smaller than the predetermined value, then the procedure goes to step S102 in which a mode other than the portrait mode is set because, in this case, sufficient separation of the background and the subject face is considered to be impossible.

In such a mode, even if an object of distance determination is a person, the distance can be determined accurately without limiting the distance measuring area because the brightness difference between the background and the subject is small. Thus, data from $S(n_1)$ to $S(n_2)$ is used for distance determination.

If, on the other hand, the maximum value of difference is greater than the predetermined value in steps S98 and S99, a decision is made as to whether the difference between adjacent pieces of data changes from positive to negative or from negative to positive in steps S100 and S101. This corresponds to the detection of an upward peak or a downward peak. If it does, the procedure goes to step S103 in which the portrait-compatible distance determination is made using only sensor data from $S(ns_1)$ to $S(ns_2)$.

If the detection ends in failure in steps S100 and S101, then the procedure goes to step S102.

In a scene in which near and distant subjects are not mixed, the more the number of pieces of data used for distance determination, the more the accuracy will increase. With the number of pieces of data increased, the method of limiting the measuring area only when near and distant subjects are mixed will allow as accurate focusing as possible.

The development of the above-described way of limiting the measuring area will make feasible a sixth embodiment which will be described below.

Figure 14A:
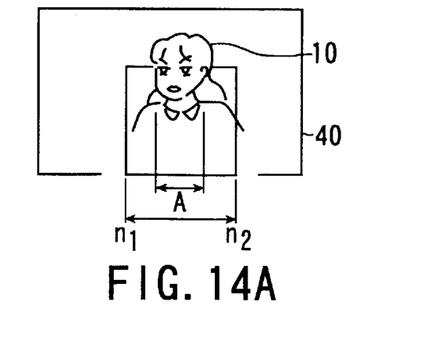
FIG. 14A shows an example of a scene in which the subject is distant.
Figure 14B:
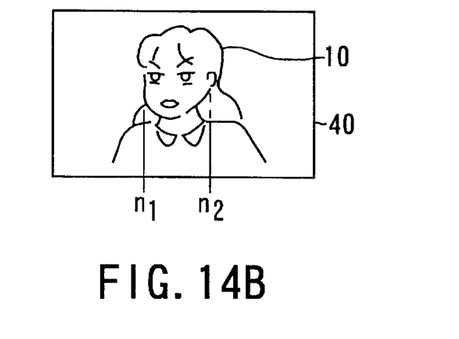
FIG. 14B shows an example of a scene in which the subject is near.

In a scene in which a subject 10 is distant as shown in FIG. 14A, the subject is easy to become blurry due to mixing of near and distant subjects. However, when the subject is near to the camera as shown in FIG. 14B, the subject face fits in the entire measuring area (from $n_1$ to $n_2$) of the sensor array, so that out-of-focus conditions never occur.

Hereinafter, the operation of the sixth embodiment will be described.

Figure 15:
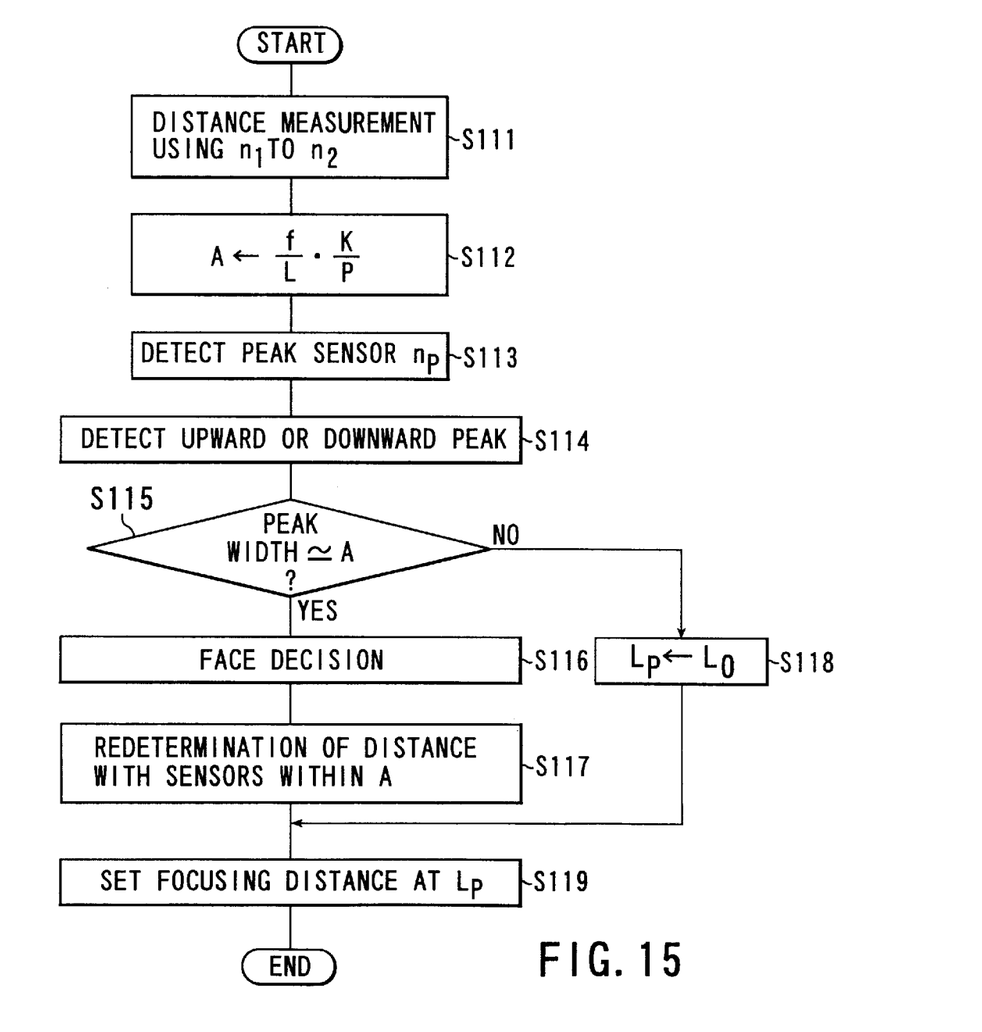
FIG. 15 is a flowchart illustrating the operation of a sixth embodiment of the present invention.

First, in step S111, a distance determination is made using the entire area from $n_1$ to $n_2$. Using the result Lo, the number A of sensor elements corresponding to the width of the face of the person 10 is calculated in step S112. In subsequent steps S113 and S114, it is detected whether the sensor data has an upward peak or a downward peak as shown in FIGS. 11 and 13.

In step S115, a decision is made as to whether or not the width between the peak edges corresponds to A already obtained. If it does, it is decided that the distance to the face is being measured in a shooting scene. In subsequent step S115, the face decision processing is performed. In this case, supposing that the possibility of near and distant subjects being mixed is high, the distance determination is made again in step S117 using sensor data within A.

If, on the other hand, it is not decided that the distance to the face is being determined, the procedure goes from step S115 to step S118. In step S118, in order to improve the accuracy of distance determination using as much data as possible, the distance Lo obtained in step S111 by the correlation operation using sensor data from $S(n_1)$ to $S(n_2)$ is set to the focusing distance $L_p$.

In subsequent step S119, focusing is set to the distance Lo.

As described above, according to the sixth embodiment, a distance determination is made first in a wide area, the number A of sensor elements corresponding to the face width is sought on the basis of the result of the distance determination, and a decision is made as to whether or not the object of shooting is a person on the basis of the obtained A. Consequently, more accurate subject decision is made possible.

Since the measuring area is limited at this time only, accurate focusing is made possible even in scenes in which near and distant subjects are mixed.

The technique of deciding forelit or backlit situations based on the shape of the sensor data peak to control exposure can also be applied readily to the sixth embodiment in accordance with the teaching of the embodiment described in conjunction with FIG. 5.

Thus, an autofocus (AF) camera can be provided which permits the distance measurement method and the exposure method to be switched automatically with no need for photographers to perform complicated operations and thereby clear pictures to be shot.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising:

object determining means responsive to output signals of the sensor arrays for determining those areas on the sensor arrays which correspond to the main subject; and operations means responsive to distributions of output signals from the areas of the sensor arrays corresponding to the main subject for calculating the displacement of one of the images relative to the other.

2. The distance measurement device according to claim 1, further comprising backlight decision means responsive output signals of the areas of the sensor arrays corresponding to the main subject for deciding whether or not the main subject is back light.

3. The distance measurement device according to claim 2, in which, when the decision by the backlight decision means is that the main subject is back light, a flash unit is activated to illuminate the subject on shooting.

4. The distance measurement device according to claim 1, further comprising area information storage means for storing information concerning the width of an area of the sensor arrays onto which a predetermined region of a person as the main subject is imaged, and in which the object determining means performs operations on the output signals of the sensor arrays on the basis of output information of the area information storage means to thereby determine the corresponding area of the sensor arrays.

5. The distance measurement device according to claim 4, in which the object determining means detects the positions of sensor elements at both ends of the sensor array area width which produce output signals the difference of which is a minimum to thereby determine the corresponding area of the sensor arrays.

6. The distance measurement device according to claim 4, in which the object determining means detects the positions of sensor elements at both ends of the sensor array area width which produce output signals the difference of which is smaller a predetermined value to thereby determine the corresponding area of the sensor arrays.

7. A distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising:

object determining means responsive to output signals of the sensor arrays for determining those areas of the sensor arrays which correspond to the main subject on the basis of the difference between a signal relating to a main subject and a signal relating to background which is a region other than the main subject; and operations means responsive to signals relating to the corresponding areas for calculating the displacement of one of the images relative to the other.

8. The distance measurement device according to claim 7, in which the object determining means determines the corresponding area on the basis of a sensor array area which is calculated to be substantially equal to the width of the face of a person as the main subject.

9. The distance measurement device according to claim 7, in which the object determining means determines the corresponding area by detecting a portion of a sensor array output waveform which varies in the form of an upward or downward peak on the basis of brightness difference between the main subject and background which is a region other than the main subject.

10. A distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising:

person sensor width information outputting means for outputting a value for a sensor array width as an area onto which a given region of a person as a subject is imaged;

object determining means responsive to output signals of the sensor arrays for determining those areas of the sensor arrays which correspond to a main subject; and person decision means for making a comparison between the sensor array width outputted by the person sensor width information outputting means and the corresponding sensor array area determined by the object determining means to decide whether the main subject is a person or not.

11. The distance measurement device according to claim 10, further comprising control means for, when the decision by the person decision means is that the main subject is not a person, calculating the displacement of one of the image signals relative to the other on the basis of output signals relating to at least the corresponding areas of the sensor arrays.

12. The distance measurement device according to claim 10, in which the object determining means calculates the value for the sensor array width outputted from the person sensor width information outputting means in accordance with the distance to the subject.

13. A distance measurement device comprising:

sensor array means for outputting signals corresponding to the distribution of brightness in a shooting scene;

detecting means for detecting an area of the sensor array means which corresponds to a portion of sensor array output distribution which shows an upward or downward peak; and decision means for deciding whether a person is included in a shooting scene or not on the basis of the number of pixels in the area of the sensor array means detected by the detecting means, in which the decision means makes a comparison between the number of pixels in the area of the sensor array means detected by the detecting means and the number of pixels calculated based on the width of human faces for decision.

14. A distance measurement device comprising:

sensor array means for outputting signals corresponding to the distribution of brightness in a shooting scene;

detecting means for detecting an area of the sensor array means which corresponds to a portion of sensor array output distribution which shows an upward or downward peak;

decision means for deciding whether a person is included in a shooting scene or not on the basis of the number of pixels in the area of the sensor array means detected by the detecting means; and control means for, when it is decided by the person decision means that a person is included, performing shooting control in such a way that the person is shot properly.

15. The distance measurement device according to claim 14, in which the control means controls at least one of a ranging method and an exposure control method.

16. A camera distance measurement device which forms each of two images of a subject which are incident through two optical paths having parallax onto a respective one of two opto-electric conversion sensor arrays and senses the displacement of one of two images signals output from the sensor arrays relative to the other to thereby determine the distance to the subject, comprising:

detecting means for detecting an area of the sensor arrays in which the distribution of output signals varies;

person decision means for deciding whether a person is included in a shooting scene or not on the basis of the number of pixels in the sensor array area detected by the detecting means; and control means for, when it is decided by the person decision means that a person is included, casing the distance measurement device to make distance determination again using the pixels in the sensor array area detected by the detecting means.

17. The distance measurement device according to claim 16, in which the detecting means detects a sensor array area where the sensor array output distribution changes in the form of an upward or downward peak.

18. A distance measurement device having sensor arrays for detecting image signals which differ in field of view comprising:

specific portion selecting means for selectively extracting image signals associated with a specific portion in the different fields of view from output signals of the sensor arrays; and identifying means for examining a pattern that the selectively extracted image signals changes, detecting the pattern to be a pattern that the image signals change upward and then downward or a pattern that the image signals change downward and then upward, and identifying an image signal associated with a subject to be focused on the basis of the shape and width of the pattern detected.

19. A distance measurement device having sensor arrays for detecting image signals which differ in field of view comprising:

specific portion selecting means for selectively extracting image signals associated with a specific portion in the different fields of view from output signals of the sensor arrays;

operations means for calculating a focusing distance using image signals associated with the specific portion;

determining means for determining the image area of an object to be focused using the first focusing distance calculated by the operations means; and operations control means responsive to image signals associated with the determined image area for calculating a second focusing distance.

20. The distance measurement device according to claim 19, in which the determining means detects a specific pattern that image signals changes upward and then downward or pattern that the image signals change downward and then upward to thereby determine the image area.

21. The distance measurement device according to claim 20, in which the determining means sets constant the width of an area of the sensor array for which the signal changing pattern is to be detected and detects the pattern while shifting the position of the area of the sensor array along its length.

22. The distance measurement device according to claim 20, in which the determining means detects the pattern while changing the width of an area of the sensor array for which the signal changing pattern is to be detected.

23. A distance measurement device having sensor arrays for detecting image signals which differ in field of view comprising:

specific portion selecting means for selectively extracting image signals associated with a specific portion in the different fields of view from output signals of the sensor arrays;

maximum/minimum detecting means for examining a pattern of changes of the image signals associated with the specific portion and detecting its maximum or minimum; and identifying means for identifying an image signal associated with a subject to be focused in accordance with changes of the image signals on both sides of the maximum or minimum.

24. A distance measurement device having sensor arrays for detecting image signals which differ in field of view comprising:

difference detecting means for detecting a difference between output signals of adjacent sensor elements in the sensor arrays;

image signal distribution shape deciding means for deciding the shape of the distribution of image signals in accordance with output signals of the difference detecting means and image signals from the sensor arrays; and identifying means responsive to the image signal distribution shape deciding means for identifying an image signal associated with a subject to be focused.

25. A distance measurement device having sensor arrays for detecting image signals which differ in field of view comprising:

pattern detecting means for detecting a pattern by which image signals change using the sensor arrays; and changing means responsive to the pattern detecting means for changing the effective number of pixels in each of the sensor arrays by decreasing the effective number to identify an image signal associated with a subject to be focused.

26. A distance measurement device having sensor arrays for detecting image signals which differ in field of view comprising:

pattern detecting means for examining the shape of a pattern of changes of image signals by sequentially comparing an output of each sensor element with that of the adjacent sensor element in the sensor arrays;

identifying means for identifying an image signal associated with a subject to be focused in accordance with the pattern of changes of image signals; and operations means for calculating the distance to the subject in accordance with the image signals identified, in which the pattern identified by the pattern detecting means is a pattern that image signals change upward and then downward or a pattern that image signals change downward and then upward.

27. A distance measurement device having sensor arrays for detecting image signals which differ in field of view comprising:

pattern detecting means for examining the shape of a pattern of changes of image signals by sequentially comparing an output of each sensor element with that of the adjacent sensor element in the sensor arrays;

identifying means for identifying an image signal associated with a subject to be focused in accordance with the pattern of changes of image signals; and operations means for calculating the distance to the subject in accordance with the image signals identified, in which the pattern detecting means sets constant the width of an area of the sensor array for which the signal changing pattern is to be detected and detects the pattern while shifting the position of the area of the sensor array along its length.

28. A distance measurement device having sensor arrays for detecting image signals which differ in field of view comprising:

pattern detecting means for examining the shape of a pattern of changes of image signals by sequentially comparing an output of each sensor element with that of the adjacent sensor element in the sensor arrays;

identifying means for identifying an image signal associated with a subject to be focused in accordance with the pattern of changes of image signals; and operations means for calculating the distance to the subject in accordance with the image signals identified, in which the pattern detecting means has a pattern change decision starting sensor and detects the pattern while changing the width of an area of the sensor array for which the signal changing pattern is to be detected with the pattern change decision starting sensor fixed.

* * * * *